(12) United States Patent
Gailla et al.

(10) Patent No.: US 9,270,182 B2
(45) Date of Patent: Feb. 23, 2016

(54) CONVERSION STAGE, ELECTRIC CONVERTER INCLUDING SUCH A CONVERSION STAGE, DEVICE FOR CONVERTING AN AC CURRENT INTO DC CURRENT INCLUDING SUCH A CONVERTER, TERMINAL FOR RECHARGING AN ELECTRIC BATTERY INCLUDING SUCH A CONVERTER OR CONVERSION DEVICE

(71) Applicant: SCHNEIDER ELECTRIC INDUSTRIES SAS, Rueil-Malmaison (FR)

(72) Inventors: Charles Gailla, Saint Martin d'Heres (FR); Luc Meysenc, Mens (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 353 days.

(21) Appl. No.: 13/837,794

(22) Filed: Mar. 15, 2013

(65) Prior Publication Data

US 2013/0293193 A1    Nov. 7, 2013

(30) Foreign Application Priority Data

May 4, 2012 (FR) ...................................... 12 54136
Nov. 13, 2012 (FR) ...................................... 12 60799

(51) Int. Cl.

| | |
|---|---|
| H02M 3/335 | (2006.01) |
| B60L 11/18 | (2006.01) |
| H02J 7/02 | (2006.01) |
| H02M 7/81 | (2006.01) |
| H02M 3/155 | (2006.01) |
| H02M 3/158 | (2006.01) |

(52) U.S. Cl.
CPC ....... H02M 3/33507 (2013.01); B60L 11/1811 (2013.01); B60L 11/1816 (2013.01);
(Continued)

(58) Field of Classification Search
CPC ..................................................... Y02T 90/14

USPC .......................................................... 320/109
See application file for complete search history.

(56) References Cited

U.S. PATENT DOCUMENTS

| | | |
|---|---|---|
| 3,736,490 A | 5/1973 | Fallon et al. |
| 4,920,475 A | 4/1990 | Rippel |

(Continued)

FOREIGN PATENT DOCUMENTS

| | | |
|---|---|---|
| DE | 41 07 391 A1 | 9/1992 |
| DE | 10 2009 028 959 A1 | 3/2011 |

(Continued)

OTHER PUBLICATIONS

French Preliminary Search Report issued Jan. 30, 2013, in Patent Application No. FR 1254136, filed May 4, 2012 (With English Translation of Category of Cited Documents).

*Primary Examiner* — Samuel Berhanu
*Assistant Examiner* — Tessema Kebede
(74) *Attorney, Agent, or Firm* — Oblon, McClelland, Maier & Neustadt, L.L.P.

(57) ABSTRACT

The electric conversion stage according to the invention can be connected on one hand to intermediate terminals of a DC voltage electric bus, and on the other hand to output terminals. It comprises P switching branches, P≥2, the switching branches being connected in parallel between the intermediate terminals, each switching branch including first and second controllable electronic switches connected serially and connected to each other by a midpoint, each switch including a semiconductor switching element and a diode connected in anti-parallel to the semiconductor element, and means for controlling the electronic switches according to a control law. It also comprises a capacitor connected between the two output terminals and, for each switching branch, an electromagnetic coil connected between a terminal of the capacitor and the midpoint of the corresponding switching branch, and the control law is selected from among a first control law and a second control law, the first control law being such that the semiconductor element of each first switch is always off, and the second control law being such that the semiconductor element of each second switch is always off.

13 Claims, 10 Drawing Sheets

(52) U.S. Cl.
CPC ............ B60L11/1825 (2013.01); H02J 7/022 (2013.01); *B60L 2210/12* (2013.01); *B60L 2210/30* (2013.01); *B60L 2240/547* (2013.01); *H02M 7/81* (2013.01); *H02M 2003/1552* (2013.01); *H02M 2003/1586* (2013.01); *Y02T 10/7005* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | |
|---|---|---|---|
| 5,157,319 A | 10/1992 | Klontz et al. | |
| 5,500,579 A * | 3/1996 | Kim et al. | 318/493 |
| 5,952,812 A * | 9/1999 | Maeda | 318/803 |
| 2011/0050174 A1 * | 3/2011 | King et al. | 320/134 |
| 2011/0187185 A1 | 8/2011 | Dupuy | |
| 2012/0020136 A1 * | 1/2012 | Akaishi et al. | 363/131 |
| 2012/0091792 A1 | 4/2012 | Wu et al. | |

FOREIGN PATENT DOCUMENTS

| | | |
|---|---|---|
| DE | 10 2010 039 886 A1 | 3/2012 |
| EP | 2 405 565 A1 | 1/2012 |
| FR | 2 934 217 | 1/2010 |
| WO | 2011/159241 A1 | 12/2011 |

* cited by examiner

CONVERSION STAGE, ELECTRIC CONVERTER INCLUDING SUCH A CONVERSION STAGE, DEVICE FOR CONVERTING AN AC CURRENT INTO DC CURRENT INCLUDING SUCH A CONVERTER, TERMINAL FOR RECHARGING AN ELECTRIC BATTERY INCLUDING SUCH A CONVERTER OR CONVERSION DEVICE

BACKGROUND OF THE INVENTION

The present invention relates to an electric conversion stage, capable of being connected on one hand to intermediate terminals of a DC voltage electric bus, and on the other hand to output terminals, the conversion stage comprising P switching branches, P being greater than or equal to 2, preferably equal to 3, the switching branches being connected in parallel between the intermediate terminals, each switching branch including first and second controllable electronic switches connected serially and connected to each other by a midpoint, the first switch being connected between the first intermediate terminal and the corresponding midpoint, and the second switch being connected between the second intermediate terminal and the corresponding midpoint, each switch including a semiconductor element and a diode connected in anti-parallel to the semiconductor element, each semiconductor element being switchable between an on state and an off state, and control means for controlling the electronic switches according to a control law.

The present invention also relates to an electric converter, capable of being linked to an AC electrical network including M phase(s), M being greater than or equal to 1, the converter comprising a first conversion stage forming a voltage rectifier and a second conversion stage connected as output of the first conversion stage, the second conversion stage being as defined above.

The invention also relates to a device for converting AC current into a DC current including such an electric converter.

The invention also relates to a terminal for recharging an electric battery, in particular a motor vehicle electric battery, comprising such an electric converter or such a conversion device.

The invention in particular applies to a recharging terminal capable of delivering, as output, a DC voltage comprised between 5 V and 1 kV, preferably comprised between 10 V and 500 V, and a DC current comprised between 0 and 250 A, preferably comprised between 0 and 125 A.

In order to recharge an electric battery, a device is known for converting AC current into a DC current that can be linked to an AC electric network, such as a three-phase network. This conversion device comprises a voltage rectifier connected to the three-phase network, the voltage rectifier being formed by a diode bridge. This conversion device also comprises a Buck converter connected as output of the voltage rectifier and capable of converting a DC voltage from the rectifier into another DC voltage with a lower value.

The Buck converter comprises two input terminals, two output terminals, as well as a switch and a diode that are connected between the input terminals and linked to each other by an intermediate point. The Buck converter also comprises a capacitor connected between the two output terminals and an electromagnetic coil connected between a terminal of the capacitor and said intermediate point. This switch is a semiconductor element, such as a transistor.

However, the transistor and the electromagnetic coil are relatively expensive and also have a significant bulk, the transistor and the electromagnetic coil being dimensioned to allow the passage of strong currents, such as currents of approximately 100 A.

SUMMARY OF THE INVENTION

The aim of the invention is therefore to propose a lower-cost conversion stage, while allowing the passage of strong currents, such as currents of approximately 100 A.

To that end, the invention relates to a conversion stage of the aforementioned type, wherein the conversion stage also comprises a capacitor connected between the two output terminals and, for each switching branch, an electromagnetic coil connected between a terminal of the capacitor and the midpoint of the corresponding switching branch, and in that the control law is selected from among a first control law and a second control law, the first control law being such that the semiconductor element of each first switch is always off, and the second control law being such that the semiconductor element of each second switch is always off.

According to other advantageous aspects of the invention, the conversion stage comprises one or more of the following features, considered alone or according to any technically possible combinations:
 the first control law is such that the semiconductor element of each second switch is controlled cyclically from the off state to the on state, then from the on state to the off state;
 the second control law is such that the semiconductor element of each first switch is cyclically controlled from the off state to the on state, then from the on state to the off state;
 the conversion stage forms, according to the first control law, a Boost converter capable of converting a DC voltage between the intermediate terminals into another DC voltage with a higher value, between the output terminals, and/or the conversion stage forms, according to the second control law, a Buck converter capable of converting the DC voltage between the intermediate terminals into another DC voltage with a lower value, between the output terminals;
 the conversion stage is capable of successively selecting the first control law, then the second control law so as to go from a Boost conversion operating mode to a Buck conversion operating mode, or successively from the second control law to the first control law so as to go from a Buck conversion operating mode to a Boost conversion operating mode;
 the control means are capable of controlling the electronic switches of the switching branches, each according to a switching law, and the switching laws of the switching branches are offset from one another;
 the switching laws of each of the branches are of the same frequency and are phase-shifted relative to one another, the phase shift between the switching laws of each of the branches preferably being equal to 360°/P.

The present invention also relates to an electric converter, capable of being linked to an AC electrical network including M phase(s), M being greater than or equal to 1, the converter comprising M input terminal(s), the or each input terminal corresponding to a phase of the AC network, first and second intermediate terminals, and two output terminals, a first conversion stage, connected to the input terminals and including a voltage rectifier capable of converting the AC input voltage into a DC intermediate voltage delivered between the first and second intermediate terminals, and a second conversion stage, connected to the intermediate terminals at the output of the first conversion stage, and wherein the second conversion stage is as defined above.

According to another advantageous aspect of the invention, the electric converter comprises the following feature:

the converter also comprises a relooping link connected between one of the two output terminals and a filter, the filter being connected at the output of the voltage rectifier, the relooping link enabling to monitor the discharge from the capacitor connected between the two output terminals.

The present invention also relates to a device for converting an alternating current into a direct current, the conversion device being capable of being linked to an AC electrical network including M phase(s), M being greater than or equal to 1, the conversion device comprising a voltage transformer comprising a primary circuit having M primary winding(s), first and second secondary circuits each including M secondary winding(s), a first electric converter connected to the first secondary circuit, and a second electric converter connected to the second secondary circuit, wherein the first and second electric converters are each as defined above.

According to another advantageous aspect of the invention, the conversion device comprises the following feature:

M is equal to 3, the three primary windings are connected in a star, the three secondary windings of the first secondary circuit are connected in a triangle, and the three secondary windings of the second secondary circuit are connected in a star.

The present invention also relates to a terminal for recharging an electric battery, in particular a motor vehicle electric battery, comprising a housing and an electric connector designed to be electrically linked to the battery, wherein the recharge terminal comprises a conversion element from among an electric converter as defined above and a conversion device as defined above, the conversion element being positioned in the housing.

BRIEF DESCRIPTION OF THE DRAWINGS

According to another advantageous aspect of the invention, the recharge terminal comprises the following feature:

the terminal also comprises an electric connecting cable, arranged at least partially outside the housing and linking the electric connector to the conversion element.

These features and advantages of the invention will appear upon reading the following description, provided solely as a non-limiting example, and done in reference to the appended drawings, in which.

DETAILED DESCRIPTION OF PREFERRED EMBODIMENTS

Figure 1:
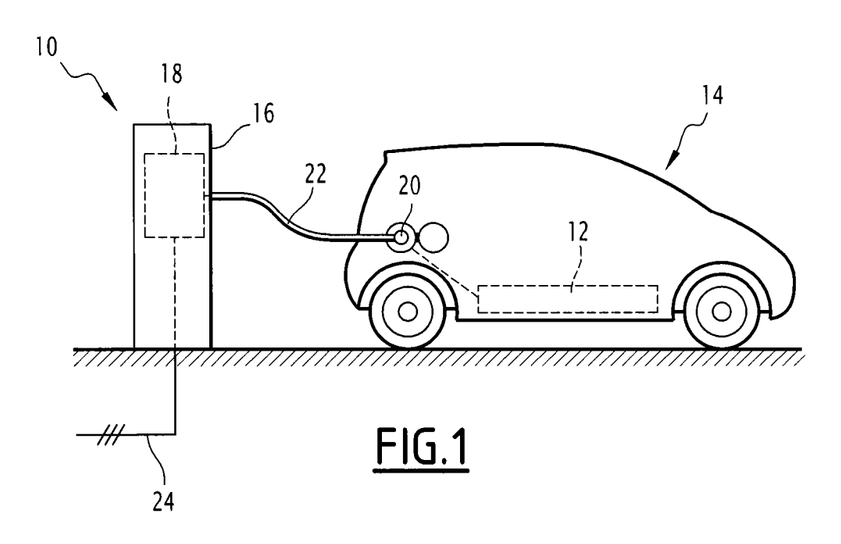
FIG. 1 is a diagrammatic illustration of a recharge terminal including an electric connecting cable provided with an electrical connector plugged into a complementary connector of a motor vehicle.

In FIG. 1, a terminal 10 for recharging an electric battery 12 of a motor vehicle 14 comprises a housing 16 and an electric conversion element 18 positioned in the housing 16.

The recharge terminal 10 also comprises an electric connector 20 designed to be electrically connected to the battery 12. In a complementary manner, the terminal 10 comprises an electric connecting cable 22, arranged at least partially outside the housing 16 and linking the electric connector 20 to the conversion element 18.

In an alternative not shown, the recharge terminal 10 does not include an electric connecting cable arranged outside the housing, the electric connector 20 then being directly fixed on the housing 16. According to this alternative, the motor vehicle 14 is equipped with an electric connecting cable, so as to be able to connect the electric battery 12 to the connector 20 of the recharge terminal.

The housing 16 is provided to protect the conversion element 18 from various weather conditions, in particular rain, the recharge terminal 10 being positioned in a road.

The conversion element 18 is linked to an AC electrical network 24 including M phases, M being greater than or equal to 1. In the example embodiment of FIG. 1, the AC network 24 is a three-phase network, and M is equal to 3. The three-phase network 24 for example has a voltage of approximately 400 V in three-phase mode and a frequency equal to 50 Hz or 60 Hz.

Figure 6:
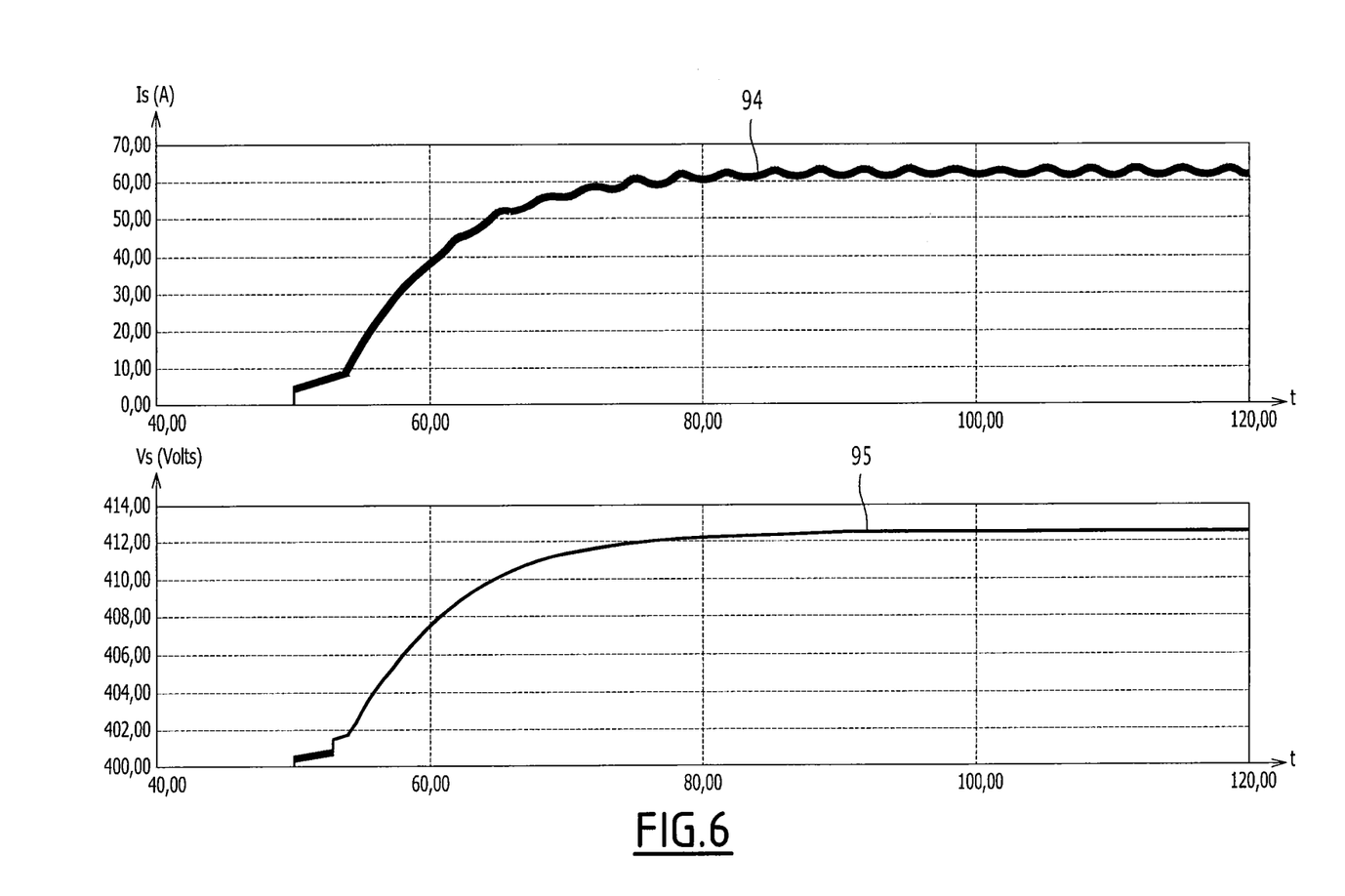
FIG. 6 is a set of two curves respectively showing the current and voltage delivered at the output of the conversion element of FIG. 2, in Buck operating mode of the second conversion stage.

The conversion element 18 is capable of converting the AC current of the network 24 into a DC current. The conversion element 18 is capable of delivering a DC output voltage Vs comprised between 5 V and 1 kV, preferably comprised between 10 V and 500 V, and a DC output current Is comprised between 0 A and 250 A, preferably between 0 A and 125 A, as shown in FIG. 6. The conversion element 18 has an output power of approximately 50 kW. The ripple of the output current Is is less than 6 A in peak-to-peak.

Figure 2:
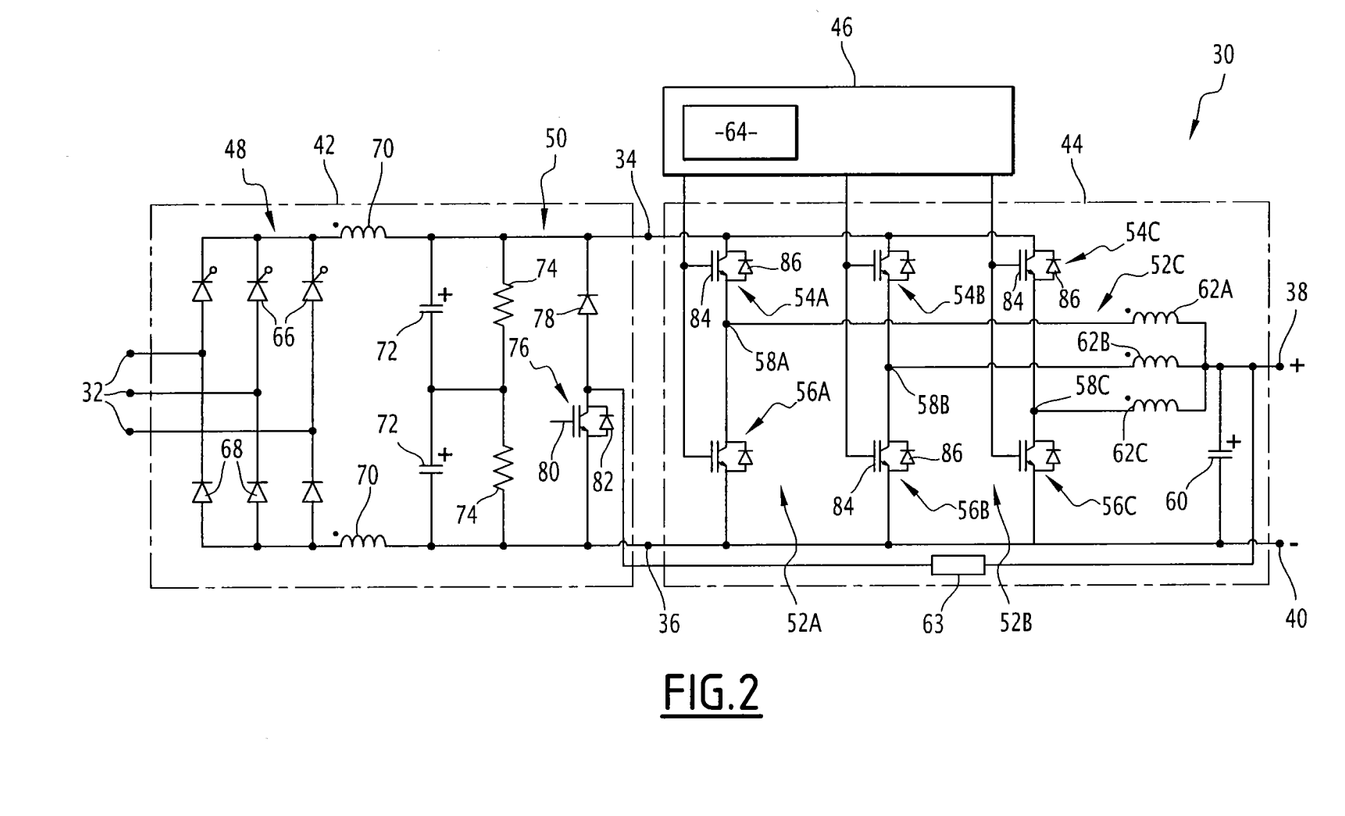
FIG. 2 is an electrical diagram of a conversion element according to a first embodiment of the invention, comprising a first conversion stage and a second conversion stage connected at the output of the first stage, the second stage including three switching branches, each switching branch including first and second switches each formed by a semiconductor element and a diode connected in anti-parallel with the semiconductor element.

According to a first embodiment, the conversion element 18 is an electric converter 30, shown in FIG. 2. The electric converter 30 comprises M input terminals 32, the or each input terminal 32 corresponding to a phase of the AC network 24, first 34 and second 36 intermediate terminals, a positive output terminal 38 and a negative output terminal 40. In the example embodiment of FIG. 2, the converter 30 comprises three input terminals 32, the converter 30 being designed to be linked to the three-phase network 24.

The electric converter 30 comprises a first conversion stage 42 connected between the input terminals 32 and the intermediate terminals 34, 36, and a second conversion stage 44 connected at the output of the first stage 42, between the intermediate terminals 34, 36 and the output terminals 38, 40. The electric converter 30 also comprises a control member 46 for the second conversion stage 44.

The first conversion stage 42 includes a voltage rectifier 48, capable of converting the AC input voltage into a DC intermediate voltage and delivering the intermediate DC voltage across the first and second intermediate terminals 34, 36.

As a complement, the first conversion stage 42 includes a filter 50 connected at the output of the voltage rectifier 48.

The second conversion stage 44 includes P switching branches 52A, 52B, 52C connected between the intermediate terminals 34, 36, P being an integer greater than or equal to 2, each switching branch 52A, 52B, 52C including first 54A, 54B, 54C and second 56A, 56B, 56C controllable electronic switches, connected serially and linked to each other by a midpoint 58A, 58B, 58C. The switching branches 52A, 52B, 52C are connected in parallel between the intermediate terminals 34, 36.

In the example embodiment of FIG. 2, P is equal to 3 and the second conversion stage 44 comprises first 52A, second 52B and third 52C switching branches. Subsequently, each reference bearing the letter 'A' designates an element relative to the first switching branch 52A, each reference bearing a letter 'B' designates an element relative to the second switching branch 52B, and each reference bearing a letter 'C' designates an element relative to the third switching branch 52C.

The second conversion stage 44 also comprises a capacitor 60 connected between the two output terminals 38, 40 and, for each switching branch 52A, 52B, 52C, an electromagnetic coil 62A, 62B, 62C is connected between the midpoint 58A, 58B, 58C of the corresponding switching branch 52A, 52B, 52C and the terminal of the capacitor 60 linked to the positive output terminal 38.

As a complement, the second conversion stage 44 comprises a relooping resistance 63 connected between the positive output terminal 38 and the filter 50, so as to monitor the discharge of the capacitor 60 connected between the two output terminals 38, 40.

The second conversion stage 44 is reversible and is then capable of causing the current to circulate from the intermediate terminals 34, 36 toward the output terminals 38, 40, and reversibly from the output terminals 38, 40 toward the intermediate terminals 34, 36.

The control member 46 includes means 64 for controlling the electronic switches 54A, 54B, 54C, 56A, 56B, 56C according to a control law.

The voltage rectifier 48 is, for example, in the form of a mixed bridge of thyristors 66 and diodes 68, each thyristor 66 being positioned between the corresponding input terminal 32 and the first intermediate terminal 34, and each diode 68 being positioned between a corresponding input terminal 32 and the second intermediate terminal 36.

The filter 50 includes two filtering coils 70 each being connected between the voltage rectifier 48 and a corresponding intermediate terminal 34, 36. The filter 50 also comprises two filtering fasteners 72 connected serially between the intermediate terminals 34, 36 and two filtering resistances 74, each being connected in parallel with a corresponding filtering capacitor 72.

The filter 50 comprises an electronic switch 76 and a diode 78 connected serially between the intermediate terminals 34, 36, the electronic switch 76 being formed by a transistor 80 and the diode 82 connected in anti-parallel with the transistor 80. The diode 78 is connected in the on direction of the second intermediate terminal 36 toward the first intermediate terminal 34.

Each first switch 54A, 54B, 54C is connected between the first intermediate terminal 34 and the corresponding midpoint 58A, 58B, 58C, and each second switch 56A, 56B, 56C is connected between the second intermediate terminal 36 and the corresponding midpoint 58A, 58B, 58C.

Each switch 54A, 54B, 54C, 56A, 56B, 56C includes a semiconductor element 84 and a diode 86 connected in anti-parallel with the semiconductor element 84, each semiconductor element 84 being switchable between an on state and an off state.

The relooping resistance 63 is connected between the positive output terminal 38 on the one hand, and the connection point between the electronic switch 76 and the diode 78 of the filter 50 on the other hand. The relooping resistance makes it possible to monitor the discharge of the capacitor 60 by switching the electronic switch 76 so as to maintain a constant voltage at the positive output terminal 38.

The control means 64 are capable of controlling the semiconductor elements 84 of each switch according to a control law selected from among the first control law and the second control law.

The first control law is such that the semiconductor element 84 of each first switch 54A, 54B, 54C is always in the off state. The first control law corresponds to an operating mode of the second conversion stage 44. In other words, according to the first control law, for each first switch 54A, 54B, 54C, the current is capable of circulating only through the corresponding diode 86, the latter operating as a freewheel diode.

The second control law is such that the semiconductor element 84 of each second switch 56A, 56B, 56C is always in the off state. The second control law corresponds to a second operating mode of the second conversion stage 44. In other words, according to the second control law, for each second switch 56A, 56B, 56C, the current is capable of circulating only through the diode 86, the latter acting as a freewheel diode.

The first control law corresponds to a Boost operation, and the second conversion stage 44 forms, in its first embodiment, a Boost converter capable of converting the direct voltage between the intermediate terminals 34, 36 into a direct voltage with a higher value between the output terminals 38, 40.

The second control law corresponds to a Buck operation, and the second conversion stage 44 forms, in its second operating mode, a Buck converter capable of converting the direct voltage between the intermediate terminals 34, 36 into another direct voltage with a lower value between the output terminals 38, 40. The second operating mode is distinct from the first operating mode.

The control means 64 are capable of controlling the semiconductor elements 84 alternatingly according to the first control law and the second control law, while being suitable for going from the first control law to the second control law and, conversely, from the second control law to the first control law, for example depending on the electric battery to be charged, or the direction of circulation of the current through the second conversion stage 44, the second conversion stage 44 being reversible. The second conversion stage 44 then alternatingly forms a Boost converter and a Buck converter.

In other words, the conversion stage 44 is capable of successively selecting the first control law, then the second control law so as to go from a Boost conversion operating mode to a Buck conversion operating mode, or capable of successively selecting the second control law, then the first control law so as to go from a Buck conversion operating mode to a Boost conversion operating mode.

Alternatively, the control means 64 are capable of controlling the semiconductor elements 84 only according to the first control law, and the second conversion stage 44 only forms a Boost converter.

Also alternatively, the control means 64 are capable of controlling the semiconductor element 84 only according to the second control law, and the second conversion stage 44 only forms a Buck converter.

As a complement, in the example embodiment of FIG. 2, the control means 64 are capable of controlling the electronic switches 54A, 54B, 54C, 56A, 56B, 56C of the switching branches 52A, 52B, 52C, each according to a specific switching law, and the switching laws are offset from one another.

The switching laws are, for example, of the same frequency F and are then phase-shifted relative to one another. The phase shift between the switching laws of each of the branches 52A, 52B, 52C is, for example, equal to 360°/P, where P is the number of switching branches 52A, 52B, 52C. In other words, in the example embodiment of FIG. 2, the phase shift between the switching laws is equal to 120°.

One skilled in the art will understand that the phase shift, expressed above in degrees, can also be expressed in radians, $2\pi$ radians being equal to 360°.

One skilled in the art will also understand the phase shift between switching laws expressed above angularly may also be expressed temporally by dividing said phase shift expressed in radians by a pulse $\omega$, the pulse $\omega$ being equal to $2\pi \times F$ radians/s, where F is the frequency of the switching laws.

The semiconductor element 84 is for example a transistor, such as an insulated gate bipolar transistor (IGBT). Alternatively, the semiconductor element 84 is a thyristor, such as a GTO (Gate Turn Off) thyristor.

The operation of the recharge terminal 10 will now be described.

When a user connects the electric terminal 20 of the recharge terminal with the complementary connector of his motor vehicle 14 so as to recharge the electric battery 12, the conversion element 18 is then connected to the electric battery 12, so as to deliver a DC current thereto from the AC current of the network 24.

The AC current of the network 24, present at the input terminals 32 of the conversion element, is first converted into a DC current by the voltage rectifier 48 of the first conversion stage, then filtered by the filter 50 of said first stage.

The DC voltage present at the intermediate terminals 34, 36 is then converted by the second conversion stage 44 into another DC voltage, the latter having a higher value than the DC voltage between the intermediate terminals 34, 36 when the second conversion stage 44 is in its first operating mode, or a much lower value than the DC voltage between the intermediate terminals 34, 36 when the second conversion stage 44 is in its second operating mode.

To that end, according to the first control law, the control means 64 cyclically control each of the semiconductor elements 84 of the second switches 56A, 56B, 56C from the off state to the on state, then from the on state to the off state, while the semiconductor elements 84 of the first switches 54A, 54B, 54C are still in the off state. According to the second control law, the control means 64 cyclically control each of the semiconductor elements 84 of the first switches 54A, 54B, 54C from the off state to the on state, then from the on state to the off state, while the semiconductor elements 84 of the second switches 56A, 56B, 56C are still in the off state.

The second operating mode of the second conversion stage 44, also called Buck mode, will be described in more detail hereafter using FIGS. 3 to 6.

Figure 3:
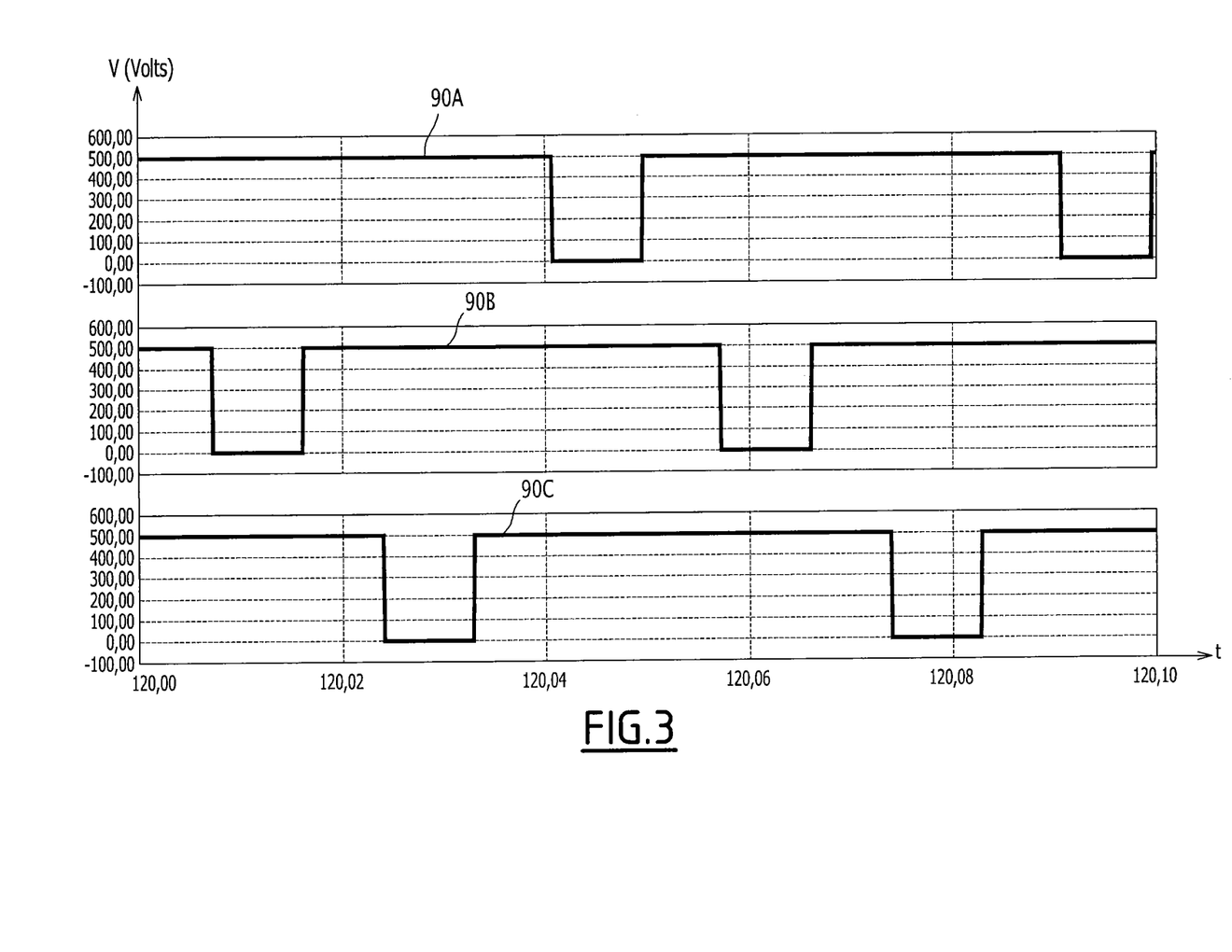
FIG. 3 is a set of three curves each illustrating the voltage across the terminals of a first corresponding switch, when the second conversion stage is operating as a Buck converter.

FIG. 3 illustrates a first curve 90A, a second curve 90B, a third curve 90B, showing the voltage across the terminals of the first switch 54A of the first branch, respectively the first switch 54B of the second branch, and respectively the first switch 54C of the third branch, according to the second operating mode of the second conversion stage 44.

Figure 4:
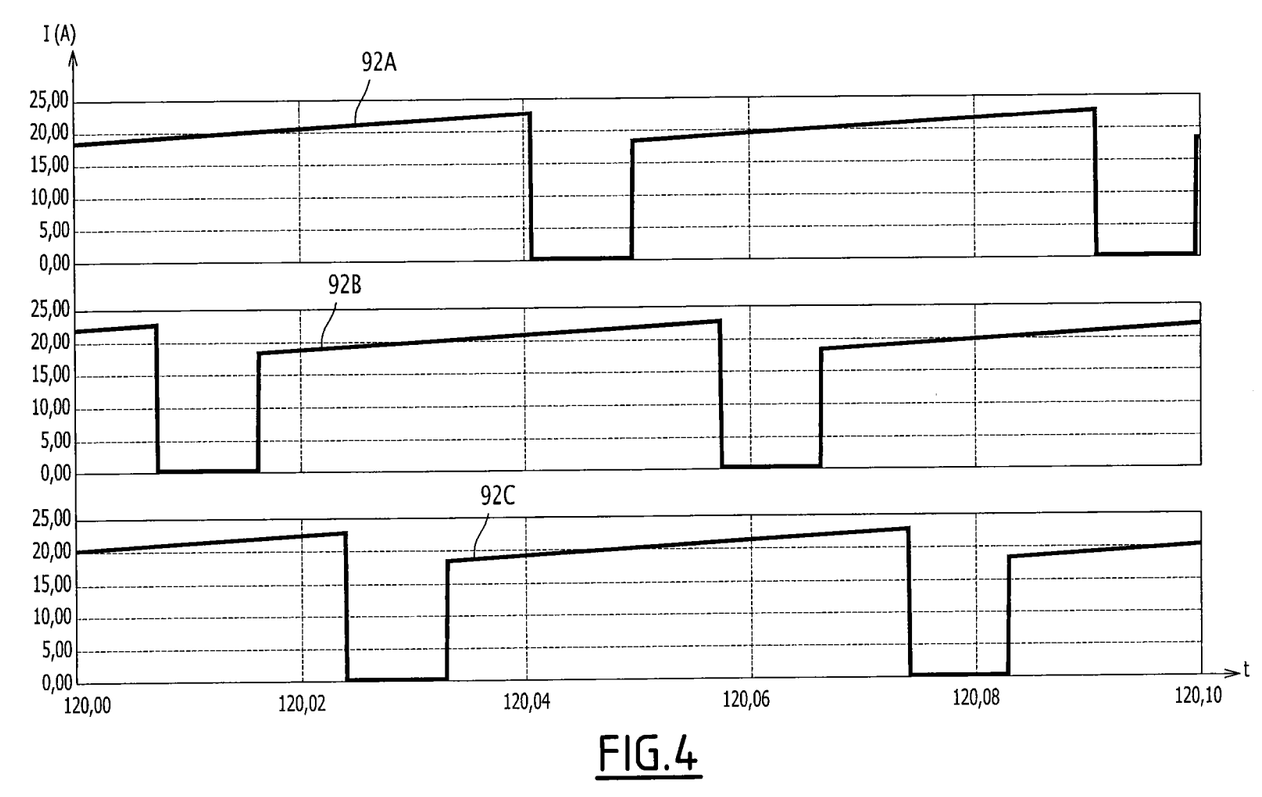
FIG. 4 is a set of three curves each showing the current circulating in the semiconductor element of the first corresponding switch, in Buck operating mode of the second conversion stage.

FIG. 4 illustrates a fourth curve 92A, a fifth curve 92B, a sixth curve 92C, showing the current circulating in the semiconductor element 84 of the first switch 54A of the first branch and respectively the first switch 54B of the second branch and respectively the first switch 54C of the third branch, according to the second operating mode of the second conversion stage 44.

Figure 5:
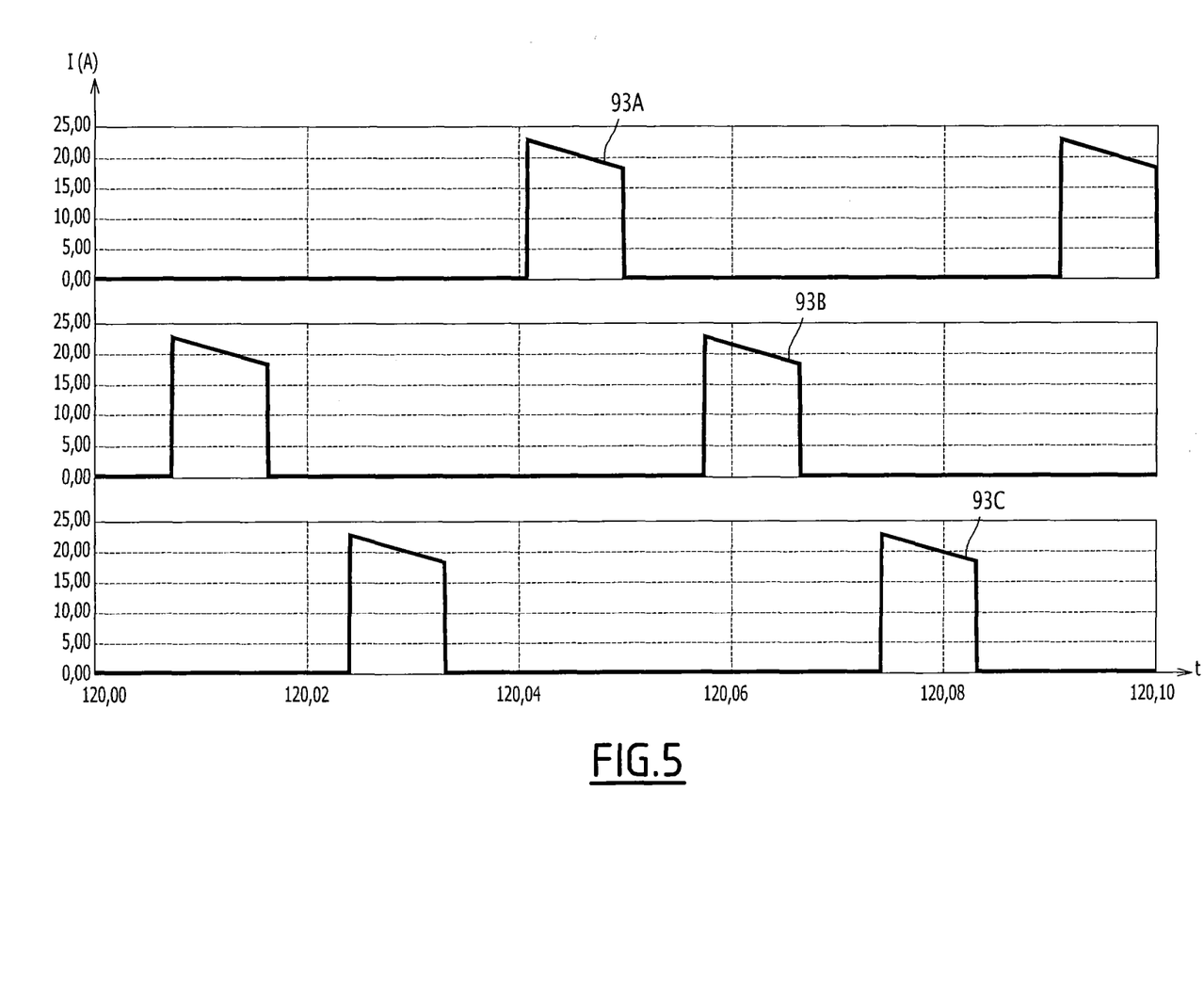
FIG. 5 is a set of three curves each showing the current circulating in the diode of a second corresponding switch, in Buck operating mode of the second conversion stage.

FIG. 5 illustrates a seventh curve 93A, an eighth curve 93B, a ninth curve 93C, showing the current circulating in the diode 86 of the second switch 56A of the first branch, respectively the second switch 56B of the second branch, and respectively the second switch 56C of the third branch, according to the second operating mode of the second conversion stage 44.

FIG. 6 lastly illustrates the tenth curve 94 and the eleventh curve 95, respectively showing the current Is and the voltage Vs delivered at the output of the converter 30, according to the second operating mode of the second conversion stage 44.

During the second operating mode, in the on state of the semiconductor element 84 of the first given switch 54A, 54B, 54C, said first switch 54A, 54B, 54C is in the closed position, as shown in FIG. 3 by the upper plateaus of the curves 90A, 90B, 90C, for which the value of the voltage of the terminals of the first corresponding switch 54A, 54B, 54C is approximately 500 V and substantially constant.

The voltage of the terminals of the corresponding electromagnetic coil 62A, 62B, 62C increases linearly, as shown in FIG. 4 by the upwardly inclined segments of the curves 92A, 92B, 92C, for which the value of the current increases by approximately 18 A up to 23 A.

The voltage of the terminals of the diode 86 of the second switch 56A, 56B, 56C connected serially with said first switch 54A, 54B, 54C in the closed position is negative, and no current then passes through said diode 86, as shown in FIG. 5 by the lower plateaus of the curves 93A, 93B, 93C, for which the value of the current is substantially zero.

During the second operating mode, in the off state of the semiconductor element 84 of a first given switch 54A, 54B, 54C, said first switch 54A, 54B, 54C is in the open position, as shown in FIG. 3 by the lower plateaus of the curves 90A, 90B, 90C, for which the value of the voltage across the terminals of the first corresponding switch 54A, 54B, 54C is substantially zero and constant.

The diode 86 of the second switch 56A, 56B, 56C connected serially with said first switch 54A, 54B, 54C in the open position becomes on. The current circulating in the corresponding electromagnetic coil 62A, 62B, 62C then decreases, as shown in FIG. 5 by the downwardly inclined segments of the curves 93A, 93B, 93C, for which the value of the current decreases by approximately 23 A to approximately 18 A.

The current ripple at each switching branch 52A, 52B, 52C is then substantially equal to 5 A in peak-to-peak.

As a complement, the switching laws of the first switches 54A, 54B, 54C are offset relative to one another, as shown in FIG. 3, where the lower plateaus of the curves 90A, 90B, 90C are offset relative to one another. The increase and decrease periods of the current in each of the electromagnetic coils 62A, 62B, 62C are then also offset from one electromagnetic coil to the next.

This offset of the switching laws then makes it possible to limit the ripple of the DC current delivered at the output of the converter 30, as shown in FIG. 6. The curves 94 shows that the ripple of the output current Is is substantially equal to 3 A in peak-to-peak, which is therefore lower than the ripple of the current circulating in each of the electromagnetic coils 62A, 62B, 62C.

In the example embodiment of FIGS. 3 to 6, the DC current Is delivered at the output of the converter 30 is slightly higher than 60 A, and the DC voltage is approximately 413 V.

Thus, the parallel connection of the switching branches 52A, 52B, 52C and of the electromagnetic coils 62A, 62B, 62C makes it possible to deliver a high output current, of approximately 100 A, for a voltage of approximately 500 V, while having a semiconductor element 84 and electromagnetic coils 62A, 62B, 62C that are inexpensive and not bulky. The electric converter 30 according to the invention has a reduced cost and bulk as a result.

Figure 7:
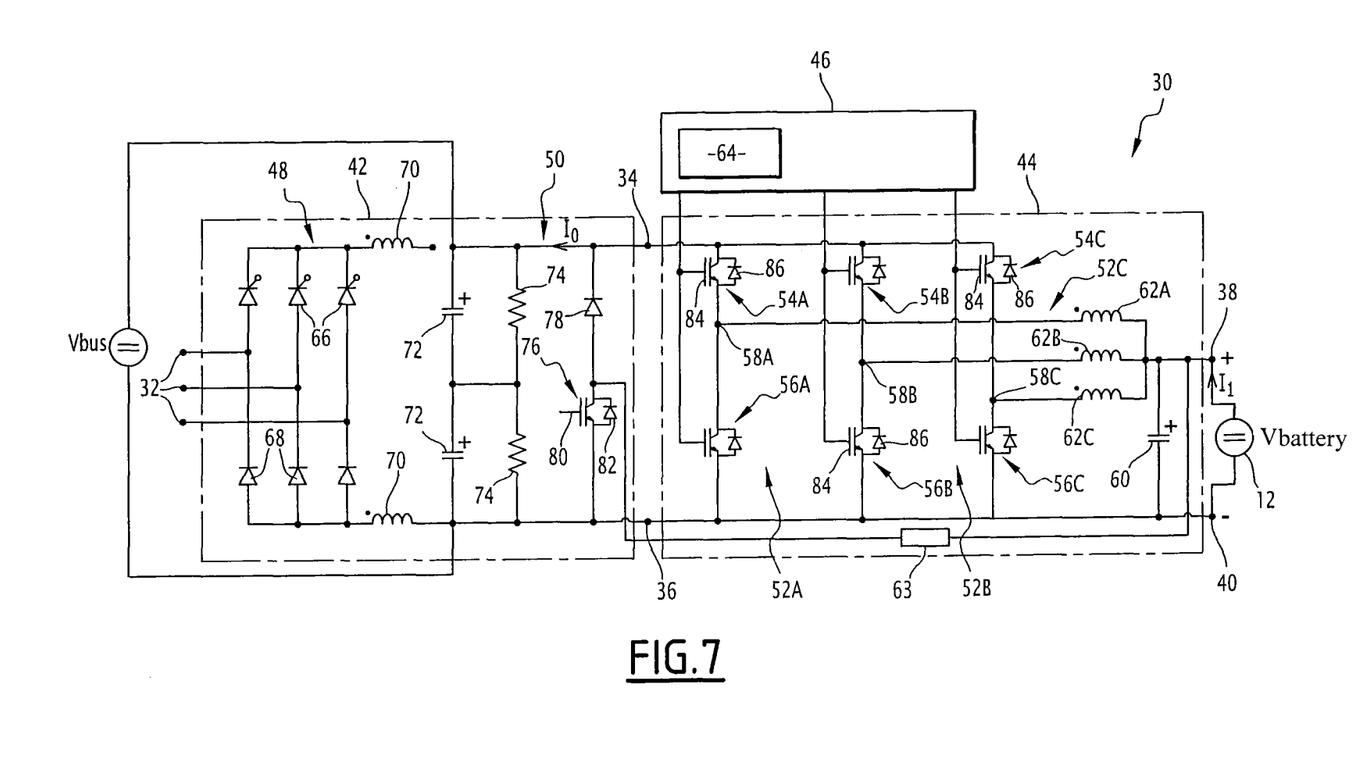
FIG. 7 is a view similar to that of FIG. 2 according to one alternative of the first embodiment.

FIG. 7 illustrates the electric converter 30 according to one alternative of the first embodiment. According to this alternative, only the second conversion stage 44 and the filter 50 connected at the input of the second stage 44 are implemented, the converter 30 being connected on the one hand to a direct voltage bus Vbus by the intermediate terminals 34, 36, and on the other hand to the electric charge to be supplied with DC voltage, such as the battery 12 having the DC voltage Vbattery, by the output terminals 38, 40. According to this alternative, the second conversion stage 44 and the filter 50 are capable of operating reversibly, the current being capable of circulating from the DC voltage bus to the electric charge, or conversely from the electric charge to the DC voltage bus.

One skilled in the art will understand that several electric converters 30 according to this alternative can be connected in parallel with each other to the same DC voltage bus. In other words, several second conversion stage 44 and filter 50 assemblies can be connected at the output of a single voltage rectifier capable of delivering a DC voltage to the DC voltage bus Vbus, from an alternating voltage.

The first operating mode of the second conversion stage 44, also called Boost mode, will be described in more detail hereafter using FIG. 8.

Figure 8:
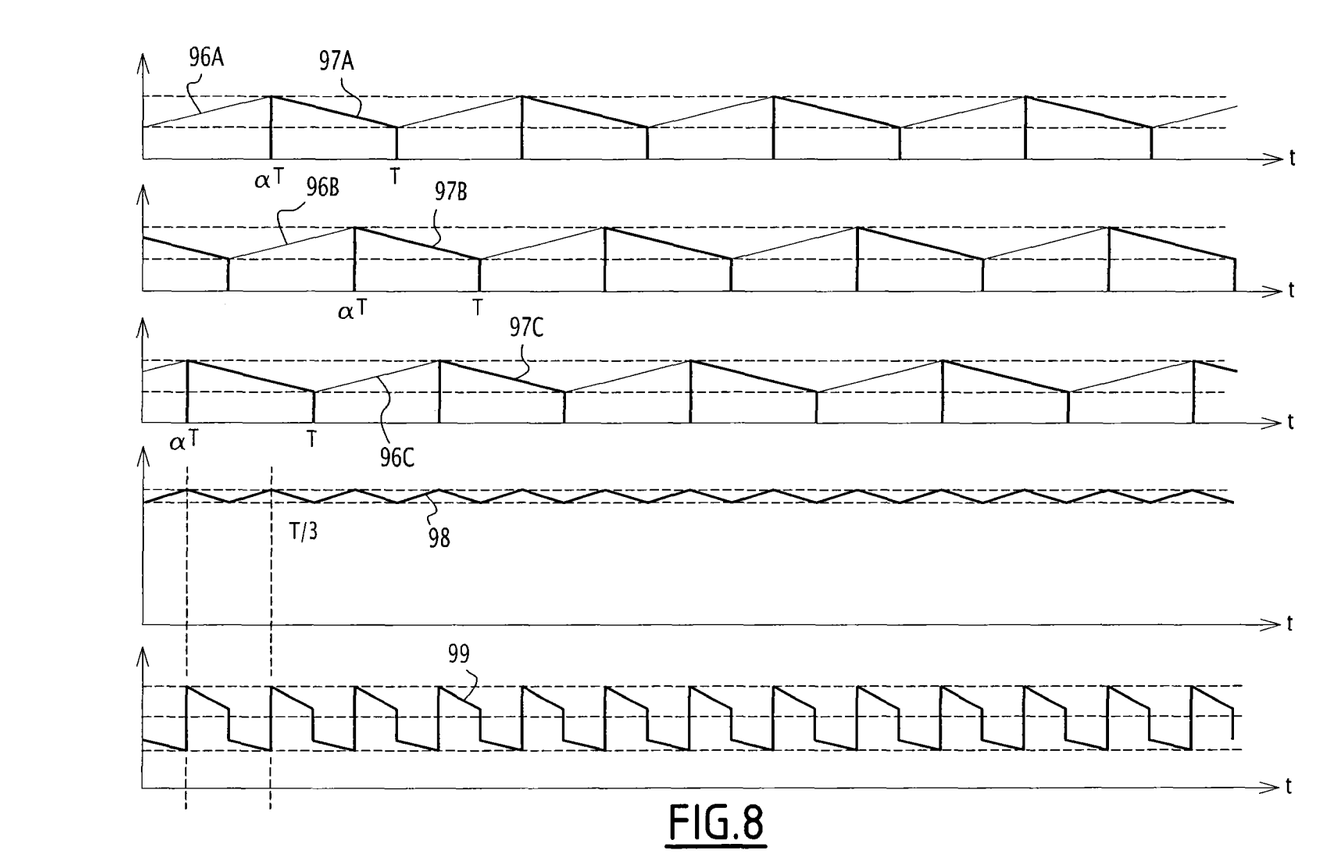
FIG. 8 is a set of curves, three curves each showing the current circulating in the diode of a first corresponding switch, three curves each showing the current circulating in the semiconductor element of the second corresponding switch, and two curves showing the current at the output of the conversion element of FIG. 2, and respectively at the input of the second conversion stage, in Boost operating mode of the second conversion stage.

FIG. 8 illustrates a twelfth curve 96A, a thirteenth curve 96B, and a fourteenth curve 96C, showing the current circulating in the semiconductor element 84 from the second switch 56A of the first branch, respectively from the second switch 56B of the second branch, and respectively from the second switch 56C of the third branch, according to the operating mode of the second conversion stage 44. The curves 96A, 96B, 96C are shown in thin lines.

FIG. 8 also illustrates a fifteenth curve 97A, a sixteenth curve 97B, and a seventeenth curve 97C, showing the current circulating in the diode 86 of the first switch 54A of the first branch, respectively of the first switch 54B of the second branch, and respectively the first switch 54C of the third branch, according to the first operating mode of the second conversion stage 44. The curves 97A, 97B, 97C are shown in thick lines.

FIG. 8 lastly illustrates an eighteenth curve 98 and a nineteenth curve 99, showing the current I1 circulating through the charge, such as the battery 12, connected at the output of the converter 30, and respectively the current I1 circulating at the input of the converter 30, according to the first embodiment of the second conversion stage 44, the currents I1 and I0 being shown in FIG. 7.

The operation of a Boost converter, i.e. the first operating mode of the second conversion stage 44, is known in itself, and is not described in more detail.

As a complement, the switching laws of the second switch is 56A, 56B, 56C are offset relative to one another. The increase and decrease periods of the current in each of the electromagnetic coils 62A, 62B, 62C are then also offset from one electromagnetic coil to the next.

This shift of the switching laws then makes it possible to limit the ripple of the DC current delivered at the output of the converter 30, as shown in FIG. 8. The curves 98 shows that the ripple of the output current Is has a low amplitude.

Figure 9:
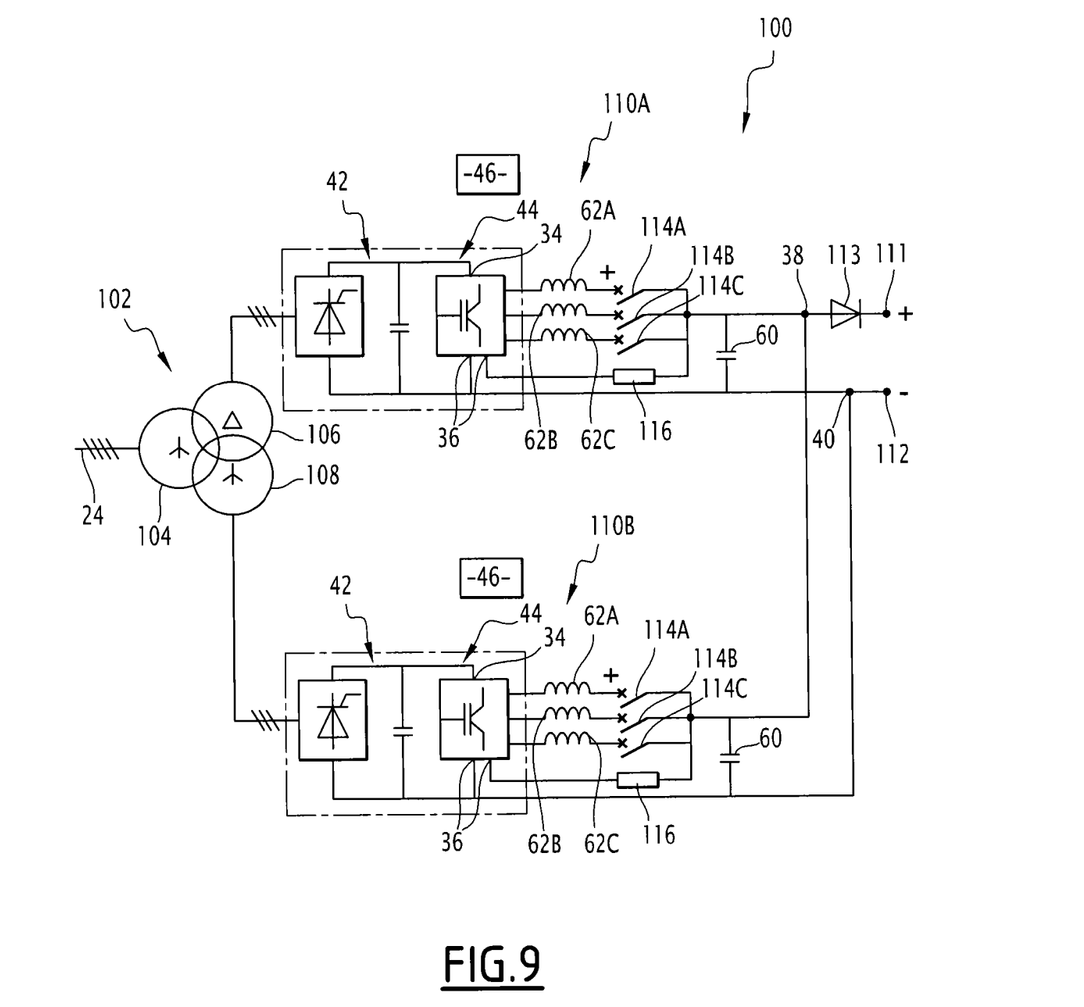
FIG. 9 is an electrical diagram of the conversion element according to a second embodiment of the invention.

FIG. 9 illustrates a second embodiment of the invention, wherein the elements similar to the first embodiment, previously described, are identified using identical references, and are therefore not described again.

According to the second embodiment, the conversion element 18 is a conversion device 100 comprising a voltage transformer 102 including a primary circuit 104, a first secondary circuit 106, and a second secondary circuit 108.

The conversion device 100 comprises a first electric converter 110A connected to the first secondary circuit 106 and a second electric converter 110B connected to the second secondary circuit 108.

The conversion device 100 also comprises a positive output terminal 111, a negative output terminal 112, and a diode 113 connected between the positive output terminals 38 of the converters 110A, 110B and the positive output terminal 111. The positive output terminals 38 of the first converter 110A and the second converter 110B are connected to each other. The negative output terminals 40 of the first converter 110A and the second converter 110B are also linked to each other.

The primary circuit 104 of the transformer includes M primary windings, not shown, where M is the number of phases of the AC network 24.

Each secondary circuit 106, 108 of the transformer includes M secondary windings, not shown.

In the example embodiment of FIG. 9, the AC network 24 is a three-phase network, M is equal to three, and the three primary windings are connected in a star. The three secondary windings of the first secondary circuit 106 are connected in a triangle, and the three secondary windings of the second secondary circuit 108 are connected in a star.

Each electric converter 110A, 110B comprises, identically to the first embodiment, a first conversion stage 42, a second conversion stage 44 connected at the output of the first stage 42, and a control member 46.

The first electric converter 110A is for example identical to the second electric converter 110B.

As a complement, the second conversion stage 44 of each converter 110A, 110B comprises, for each switching branch 52A, 52B, 52C, a circuit breaker 114A, 114B, 114C connected between the corresponding coil 62A, 62B, 62C and the capacitor 60.

As a complement, the second conversion stage 44 of each converter 110A, 110B comprises a relooping resistance 116 connected between the output of the circuit breakers 114A, 114B, 114C on the one hand, and, similarly to the first embodiment, the connection point between the electronic switch 76 and the diode 78 of the filter 50 on the other hand.

The relooping resistance makes it possible to monitor the discharge of the capacitor 60 by switching the electronic switch 76 so as to maintain a constant voltage at the positive output terminal 38.

The operation of this second embodiment is similar to that of the first embodiment, previously described, and is thus not described again.

The advantages of the second embodiment are similar to those of the first embodiment, previously described.

The conversion device 100 according to the second embodiment further makes it possible to improve the quality of energy absorbed at the electric network 24 due to the parallel association of the first converter 110A and the second converter 110B via the two secondary circuits 106, 108 of the transformer 102. The conversion device 100 then makes it possible to limit the harmonic distortion level experienced by the AC network 24 and to obtain better absorbed energy quality.

It is thus possible to see that the conversion element 18 according to the invention makes it possible to reduce the cost and bulk, while allowing the passage of strong currents, such as currents of approximately 100 A.

One skilled in the art will also understand that the second conversion stage 44 is capable of operating alternatingly in Boost conversion and Buck conversion depending on the command laws selected from among the first command law and the second command law.

Figure 10:
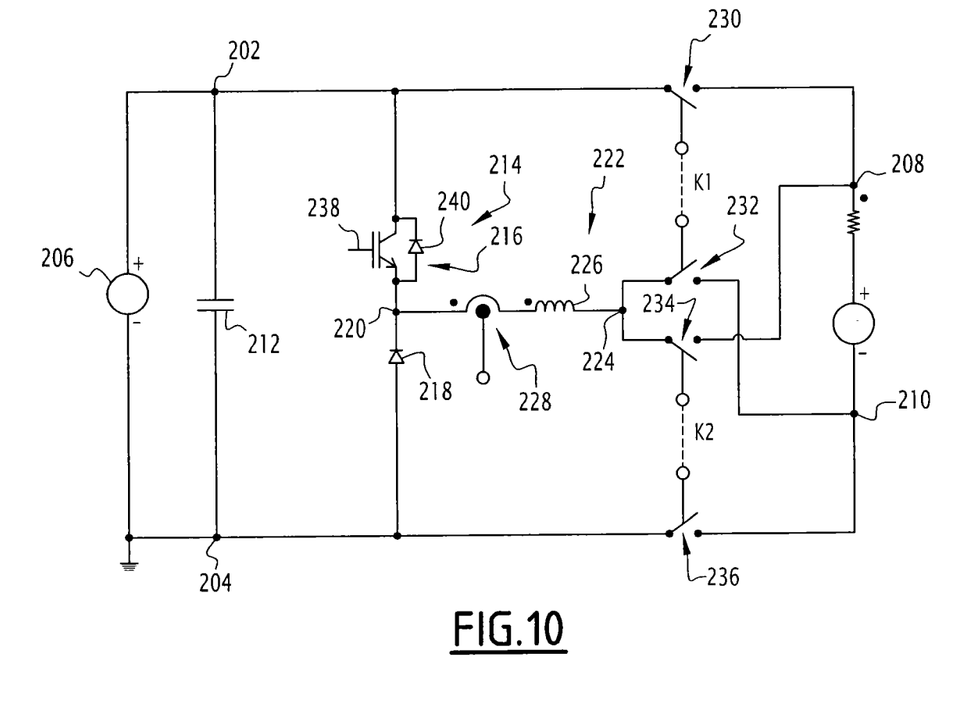
FIG. 10 is an electrical diagram of another conversion element capable of going from a Boost operating mode to a Buck operating mode, and vice versa, by switching two contactors.

FIG. 10 illustrates electrical diagram of another conversion element capable of also going from a Boost operating mode to a Buck operating mode, and vice versa, the passage from a Boost conversion to a Buck conversion and vice versa in that case occurring by switching two contactors, instead of changing a command law, from the first command law to the second, and conversely from the second command law to the first, as previously described.

In FIG. 10, the conversion element 200 comprises two input terminals 202, 204, i.e., a first input terminal 202 and a second input terminal 204, capable of being connected to a DC voltage source 206, and two output terminals 208, 210, i.e., a first output terminal 208 and a second output terminal 210, between which a direct output voltage can be delivered by the conversion element 200.

The conversion element 200 comprises a filtering capacitor 212 connected between the two input terminals 202, 204.

The conversion element 200 also comprises a switching branch 214 connected in parallel with the filtering capacitor 212, i.e., between the two input terminals 202, 204, the switching branch 214 including a controllable switch 216 and a diode 218 connected serially and linked to each other by a midpoint 220.

The conversion element 200 comprises a transverse branch 222 connected between the midpoint 220 and an intermediate point 224, the transverse branch 222 including an electromagnetic coil 226. As a complement, the transverse branch 222 includes a current sensor 228.

The conversion element 200 comprises a first contactor K1 and a second contactor K2, the first and second contactors K1, K2 being coupled such that the first contactor K1 is in the closed position when the second contactor K2 is in the open position, and conversely the first contactor K1 is in the open position when the second contactor K2 is in the closed position.

The first contactor K1 includes a first switch 230 and a second switch 232, capable of being commanded simultaneously in the open position, or in the closed position corresponding to the passage of the current through the two switches 230, 232. The first switch 230 is connected between the first input terminal 202 and the first output terminal 208, and the second sensor 132 is connected between the intermediate point 224 and the second output terminal 210.

The second contactor K2 includes a third switch 234 and a fourth switch 236, capable of being commanded simultaneously in the open position, or in the closed position corresponding to the passage of the current through the two switches 234, 236. The third switch 234 is connected between the intermediate point 224 and the output terminal 208, and the fourth switch 236 is connected between the second input terminal 204 and the second output terminal 210.

Closing the first contactor K1, i.e. closing the first and second switches 230, 232, corresponds to a Boost converter operating mode of the conversion element 200. Closing the second contactor K2, i.e. closing the third and fourth switches 234, 236, corresponds to a Buck converter operating mode of the conversion element 200.

The conversion element 200 is then capable of going simply from a Boost conversion to a Buck conversion by opening the first contactor K1 and closing the second contactor K2, and conversely from a Buck conversion to a Boost conversion by closing the first contactor K1 and opening the second contactor K2.

The controllable switch 216 includes a semiconductor element 238 and a diode 240 connected in anti-parallel with the semiconductor element 238, the semiconductor element 238 being switchable between an on state and an off state.

The semiconductor element 238 is for example a transistor, such as an insulated gate bipolar transistor (IGBT). Alternatively, the semiconductor element 238 is a thyristor, such as a GTO (Gate Turn Off) thyristor.

The invention claimed is:

1. An electric conversion stage, capable of being connected on one hand to intermediate terminals of a DC voltage electric bus, and on the other hand to output terminals, the electric conversion stage comprising:
   P switching branches, P being greater than or equal to 2, the switching branches being connected in parallel between intermediate terminals, each switching branch including first and second controllable electronic switches connected serially and connected to each other by a midpoint, the first switch being connected between the first intermediate terminal and the corresponding midpoint, and the second switch being connected between the second intermediate terminal and the corresponding midpoint, each switch including a semiconductor element and a diode connected in anti-parallel to the semiconductor element, each semiconductor element being switchable between an on state and an off state,
   control means for controlling the electronic switches according to a control rule,
   wherein the conversion stage also comprises a capacitor connected between the two output terminals and, for each switching branch, an electromagnetic coil connected between a terminal of the capacitor and the midpoint of the corresponding switching branch, and
   wherein the control rule is selected from among a first control rule and a second control rule, the first control rule being such that the semiconductor element of each first switch is always off, and the second control rule being such that the semiconductor element of each second switch is always off.

2. The conversion stage according to claim 1, wherein the first control rule is such that the semiconductor element of each second switch is controlled cyclically from the off state to the on state, then from the on state to the off state.

3. The conversion stage according to claim 1, wherein the second control rule is such that the semiconductor element of each first switch is cyclically controlled from the off state to the on state, then from the on state to the off state.

4. The conversion stage according to claim 1, wherein the conversion stage forms, according to the first control rule, a Boost converter capable of converting a DC voltage between the intermediate terminals into another DC voltage with a higher value, between the output terminals, and/or the conversion stage forms, according to the second control rule, a Buck converter capable of converting the DC voltage between the intermediate terminals into another DC voltage with a lower value, between the output terminals.

5. The conversion stage according to claim 1, wherein the conversion stage is capable of successively selecting the first control rule, then the second control rule so as to go from a Boost conversion operating mode to a Buck conversion operating mode, or successively from the second control rule to the first control rule so as to go from a Buck conversion operating mode to a Boost conversion operating mode.

6. The conversion stage according to claim 1, wherein the control means are capable of controlling the electronic switches of the switching branches, each according to a switching rule, and the switching rules of the switching branches are offset from one another.

7. The conversion stage according to claim 6, wherein the switching rules of each of the branches are of the same frequency and are phase-shifted relative to one another, the phase shift between the switching rules of each of the branches preferably being equal to 360°/P.

8. An electric converter, capable of being linked to an AC electrical network including M phase(s), M being greater than or equal to 1, the converter comprising:
M input terminal(s), the or each input terminal corresponding to a phase of the AC network first and second intermediate terminals, and two output terminals,
a first conversion stage, connected to the input terminals and including a voltage rectifier capable of converting the AC input voltage into a DC intermediate voltage delivered between the first and second intermediate terminals, and
a second conversion stage, connected to the intermediate terminals at the output of the first conversion stage,
wherein the second conversion stage is part of the electrical conversion stage according to claim 1.

9. The converter according to claim 8, wherein the converter also comprises a relooping link connected between one of the two output terminals and a filter, the filter being connected at the output of the voltage rectifier, the relooping link enabling to monitor the discharge from the capacitor connected between the two output terminals.

10. A device for converting an alternating current into a direct current, the conversion device being capable of being linked to an AC electrical network including M phase(s), M being greater than or equal to 1, the conversion device comprising:
a voltage transformer comprising a primary circuit having M primary winding(s), first and second secondary circuits each including M secondary winding(s),
a first electric converter connected to the first secondary circuit and
a second electric converter connected to the second secondary circuit,
wherein the first and second electric converters are each according to claim 8.

11. The device according to claim 10, wherein M is equal to 3, the three primary windings are connected in a star, the three secondary windings of the first secondary circuit are connected in a triangle, and the three secondary windings of the second secondary circuit are connected in a star.

12. A terminal for recharging an electric battery, in particular a motor vehicle electric battery, comprising a housing and an electric connector designed to be electrically linked to the battery,
wherein the recharge terminal comprises a conversion element from one of an electric converter and a conversion device, the conversion element being positioned in the housing,
wherein the electric converter is capable of being linked to an AC electrical network including M phase(s), M being greater than or equal to 1, the electric converter comprising:
M input terminal(s), the or each input terminal corresponding to a phase of the AC network first and second intermediate terminals, and two output terminals,
a first conversion stage, connected to the input terminals and including a voltage rectifier capable of converting the AC input voltage into a DC intermediate voltage delivered between the first and second intermediate terminals, and
a second conversion stage, connected to the intermediate terminals at the output of the first conversion stage,
wherein the second conversion stage is part of an electrical conversion stage capable of being connected on one hand to intermediate terminals of a DC voltage electric bus, and on the other hand to output terminals, the electric conversion stage comprising:
P switching branches, P being greater than or equal to 2, the switching branches being connected in parallel between intermediate terminals, each switching branch including first and second controllable electronic switches connected serially and connected to each other by a midpoint, the first switch being connected between the first intermediate terminal and the corresponding midpoint, and the second switch being connected between the second intermediate terminal and the corresponding midpoint, each switch including a semiconductor element and a diode connected in anti-parallel to the semiconductor element, each semiconductor element being switchable between an on state and an off state,
control means for controlling the electronic switches according to a control rule,
wherein the electric conversion stage also comprises a capacitor connected between the two output terminals and, for each switching branch, an electromagnetic coil connected between a terminal of the capacitor and the midpoint of the corresponding switching branch, and
wherein the control rule is selected from among a first control rule and a second control rule, the first control rule being such that the semiconductor element of each first switch is always off, and the second control rule being such that the semiconductor element of each second switch is always off,
wherein the conversion device is a device for converting an alternating current into a direct current, the conversion device being capable of being linked to an AC electrical network including M phase(s), M being greater than or equal to 1, the conversion device comprising:
a voltage transformer comprising a primary circuit having M primary winding(s), first and second secondary circuits each including M secondary winding(s),
a first electric converter connected to the first secondary circuit and a second electric converter connected to the second secondary circuit,
wherein the first and second electric converters are each corresponding to the electric converter.

13. The recharge terminal according to claim 12, wherein the terminal also comprises an electric connecting cable, arranged at least partially outside the housing and linking the electric connector to the conversion element.

* * * * *